US 6,979,419 B2

(12) United States Patent
Cameron

(10) Patent No.: US 6,979,419 B2
(45) Date of Patent: Dec. 27, 2005

(54) METHOD OF MANUFACTURING A PRINT PAD HAVING A SURFACE TEXTURED FOR PRINTING ON A HIGHLY POLISHED SURFACE SUCH AS A CONTACT LENS OR A CONTACT LENS MOLD

(76) Inventor: Robert Cameron, 3245 W. Bellwood La., Glenview, IL (US) 60025

( * ) Notice: Subject to any disclaimer, the term of this patent is extended or adjusted under 35 U.S.C. 154(b) by 436 days.

(21) Appl. No.: 10/383,203

(22) Filed: Mar. 6, 2003

(65) Prior Publication Data

US 2003/0173704 A1    Sep. 18, 2003

Related U.S. Application Data

(60) Provisional application No. 60/362,470, filed on Mar. 7, 2002.

(51) Int. Cl.$^7$ .............................................. B29C 33/40
(52) U.S. Cl. ....................... 264/220; 264/219; 264/225; 264/299
(58) Field of Search ................................ 264/219, 220, 264/225, 299

(56) References Cited

U.S. PATENT DOCUMENTS

| 4,634,484 | A | * | 1/1987 | Wagner ...................... 156/219 |
| 4,889,421 | A | | 12/1989 | Cohen |
| 5,034,166 | A | | 7/1991 | Rawlings |
| 5,120,121 | A | | 6/1992 | Rawlings |
| 5,403,532 | A | * | 4/1995 | Stecher et al. .............. 264/219 |
| 5,452,658 | A | | 9/1995 | Shell |
| 5,637,265 | A | | 6/1997 | Misciagno |
| 5,993,702 | A | * | 11/1999 | Davis ........................ 264/1.34 |
| 6,099,379 | A | | 8/2000 | Eppley |
| 6,196,683 | B1 | | 3/2001 | Quinn |
| 6,231,183 | B1 | | 5/2001 | Dillon |
| 6,656,308 | B2 | * | 12/2003 | Hougham et al. .......... 156/247 |

* cited by examiner

Primary Examiner—Allan R. Kuhns
(74) Attorney, Agent, or Firm—Robert L. Marsh

(57) ABSTRACT

A print pad for printing on hard surfaces is made by first forming a mold having a textured surface, then forming the print pad in the mold. The textured surface of the mold is made by first manufacturing a sheet of plastic the surface of which has the desired texture, then using a thermoforming process to shape the plastic into the mold.

1 Claim, 1 Drawing Sheet

METHOD OF MANUFACTURING A PRINT PAD HAVING A SURFACE TEXTURED FOR PRINTING ON A HIGHLY POLISHED SURFACE SUCH AS A CONTACT LENS OR A CONTACT LENS MOLD

The applicant claims priority from his co-pending provisional application, filed Mar. 7, 2002 and assigned Ser. No. 60/362,470. The present invention relates to print pads for applying a plurality of colors on polished surfaces, and in particular to the manufacture of a print pad having a surface textured suitable for applying colors to such lenses and to the molds for making contact lenses.

BACKGROUND OF THE INVENTION

Colored contact lenses are used to change the color of the eyes of the wearer and there are currently two dominant methods for coloring such lenses. In one method successive layers of coloring are applied to the inner surface of the mold in which the lens is formed before it is filled with this liquefied resin that hardens into a lens. In the second method, a plurality of colored inks are successively applied to the outer surface of the formed contact lens.

Since eye contact is an important element of human interaction it is important that a colored contact lens impart true texturing to the coloring of the eye of a wearer, and therefore the pattern of coloring in the contact lens must duplicate as closely as possible the complex pattern of colors of the human eye. To create such a complex pattern a plurality of colors, each with a pattern of very fine lines, are applied to the surface of each lens or to the surface of a mold used to form a lens. To create the pattern for each color, a cliche is formed with the pattern of lines etched in the surface of the cliche. Colored ink is then applied into the etchings of the cliche, and when a print pad is subsequently pressed against the surface of the cliche, the ink in the etchings of the cliche is transferred to the surface of the print pad. After the pattern has been applied to the surface of the print pad, the print pad is pressed against the smooth surface of a contact lens or a contact lens mold to transfer the ink from the print pad to the smooth surface thereof.

The pigment which makes up the coloring of the inks used to color contact lenses alter the characteristics of the ink in which it is carried and therefore the characteristic of the ink of each color is somewhat different from that of any other. The surfaces of the contact lenses and of the mold or casting cups used to form such contact lenses are exceeding smooth metal, plastic, glass or crystalline substrate, all of which are traditionally difficult material for receiving inks. A print pad which is suitable for retracting a delicate pattern of ink from a cliche and transferring that pattern to the surface of a contact lens must have a textured surface in which the degree of texturing must be carefully controlled. A print pad which does not have the proper texturing evenly applied across its useable surface will cause the inks applied to become blotted, smeared, or to be incompletely transferred.

The machines which apply coloring to contact lenses can color many thousands of lenses each day and the life expectancy of a print pad used on such machines is approximately one day. The manufactures of colored contact lenses, therefore, have a continuous need for print pads having the texturing required to properly apply coloring to contact lenses.

To obtain print pads having the needed degree of texturing the silicone print pads are formed in metal molds having polished inner surfaces such that the finished print pads have a smooth, glossy surface. The surfaces are subsequently mechanically textured using a proven texturing procedure. One such procedure is to run in a new print pad, that is, put the print pad to use for a period of time, usually fifteen to thirty minutes, until the surface thereof becomes sufficiently worn that it will properly transfer ink. Although the pad can be properly textured by "running it in," the process is time consuming and it greatly reduces the efficiency of the machine that applies color to the lenses.

In another process the surface mechanically scuffed to obtain the degree of texturing required for applying inks to contact lenses. When texturing is mechanically imparted to the surface the print pad in mounted for rotation about it axis and an abrasive surface is contacted to the surface of the print pad. Such mechanical texturing results in a pattern of elongate scratches which wrap around the circumference of the print pad. When textured print pad having a pattern of linear score lines thereon is used to print on a hard smooth surface, such as metal, plastic, glass or crystalline substrate, the pattern of ink applied lacks clarity. The cost of manufacturing a print pad for applying coloring to contact lenses could, therefore, be greatly reduced if the mold which forms the surface of the print pad can also apply the needed texturing thereto.

There have been prior efforts to manufacture molds in which the print pad are formed, with the inner surface of the molds having a texturing such that when the formed print pad is retracted from the mold with the outer surface thereof textured. This method, however, has failed to result in print pads with the consistency of the texturing needed (even distribution of peaks and valleys, all within the desired range of magnitude) to properly transfer ink to a hard surface. Until the present invention, therefore, no suitable method has been found to apply the desired texturing to the surface of the print pad.

SUMMARY OF THE INVENTION

Briefly the present invention is a method of molding a print pad having a pretextured surface suitable for applying colored inks to traditionally difficult surfaces for receiving inks, (namely: metal, plastic, glass and a crystalline substrate) and in particular to contact lenses or the molds for making contact lenses.

A print pad in accordance with the present invention is made of silicone rubber such as the type available from Dow Corning and sold under its trademark HS III RTV. The resin and catalyst needed to form the material are mixed and poured into a printpad mold which in turn has an inner surface with the desired texturing.

The mold used to form the print pad is made from plastic which is roll formed into a planar sheets by a pair of opposing rollers, at least one of which has a textured surface for imparting a complementary texture to one surface of the planar plastic being formed. Preferably, the surface of the plastic being formed should be imparted with a 30 to 70 micro inch surface finish as measured using the root mean squared (RMS) method.

Existing manufactures of plastic marketed in planar sheets provide products with pre-textured surfaces, some of which fall within a 30 to 70 RMS range. The surfaces of such pre-textured sheets having the desired texturing are sometimes marketed under the description of a "matte surface." The planar sheets of plastic are thereafter vacuum molded, or thermoformed, to create a mold for forming a print pad with the 30 to 70 RMS surfaces forming the inner surface of the mold.

BRIEF DESCRIPTION OF THE DRAWINGS

A better understanding of the invention will be had after a reading of the following detailed description taken in conjunction with the accompanying drawings wherein.

DETAILED DESCRIPTION OF A PREFERRED EMBODIMENT

Figure 1:
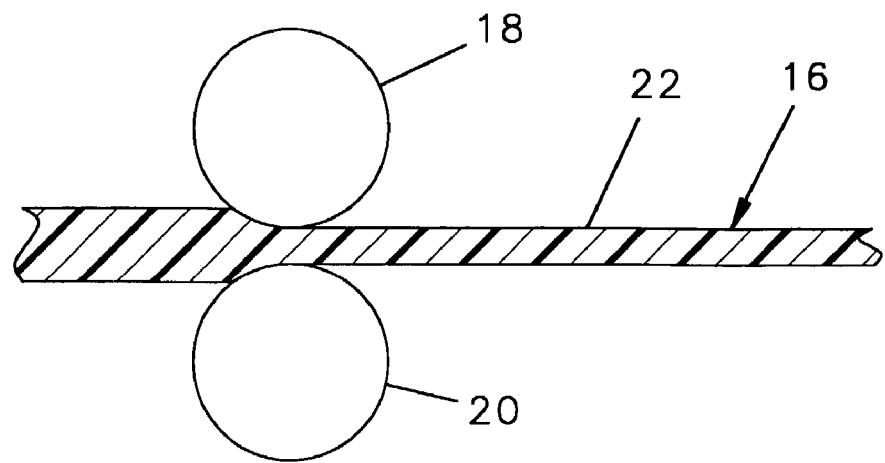
FIG. 1 is a schematic cross-sectional view of a pair of opposing rollers used to form a planar sheet of plastic having the desired characteristics.
Figure 2:
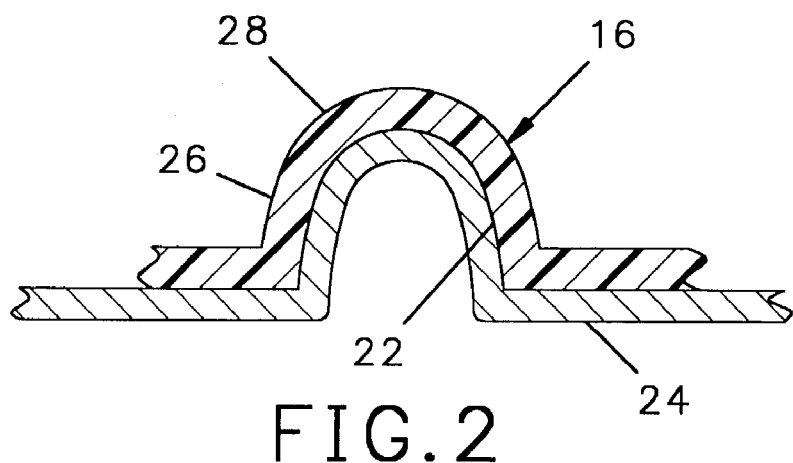
FIG. 2 is a schematic, fragmentary cross-sectional view of a planar sheet of plastic that is being thermoformed into a mold.
Figure 3:
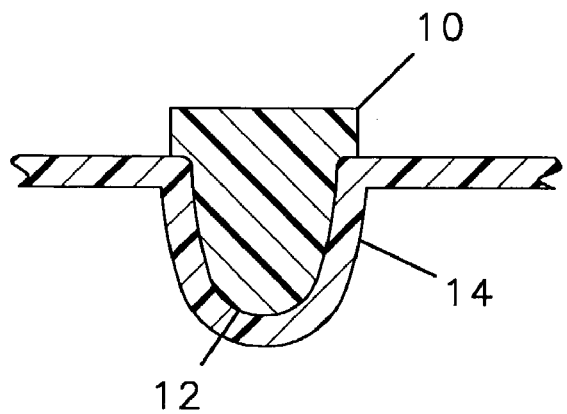
FIG. 3 is a cross-sectional view of a print pad in accordance with the invention being formed in a mold manufactured in accordance with the invention.

Referring to FIGS. 1–3, a print pad 10 having a textured surface 12 is formed using a mold 14 having a complimentary textured surface for imparting the desired texture to the surface of the print pad 10.

The mold 14 is made from a planar sheet of plastic 16 formed by a pair of opposing rollers 18, 20, one of which 18, has a textured surface for imparting texture to one surface 22 of the sheet of plastic 16. The outer surface of roller 18 is preferably made of metal and the surface thereof is textured by using conventional etching methods such as chemical, media blasting, or electrical discharge machining (EDM). The etched surface of the roller 18 will preferably impart a texture of from 30 to 70 RMS (root mean squared) to the surface 22 of the plastic sheet 16. It should be appreciated that the peaks and valleys forming the texturing of the surface of a roller 18 should have a generally uniform distribution and magnitude of the peaks and valleys. Elongate scratches of the type formed from mechanically texturing the surface 12 of a print pad print will print on hard surfaces with a lesser degree of clarity.

The planar sheet of plastic 16 is then thermoformed or vacuum formed on a male mold 24 with the textured surface 22 directed towards the mold 24. It is believed that the use of a male mold 24 results in the stretching of the plastic 16 in the annular area 26 surrounding the center 28 of the mold without significantly stretching the plastic 16 which makes up the center portion 28. Surprisingly, the thermoforming or vacuum forming process, in which the plastic 16 is heated and the heated surface 22 is draped over the surface of the male mold 24, does not result in the melting away of the texturing to the surface 22. Instead, the center portion 28 of the plastic 16, which becomes the very bottom of mold 14, is the first portion of the plastic 16 to first contact the somewhat cooler mold 24 cooling it while the annular surrounding portion 26 remains warm and stretches over the mold 24. Since the portion of the plastic which becomes the center 28 is cooled before the other portions of the plastic 16 it thereby retains the texturing to the surface thereof. The texturing of the surface 22 of the plastic is then preserved, and not lost or diminished in the center of the formed mold 14 as a result of the formation process. It should be appreciated that it is the very center of the print pad which imprints the ink to a contact lens or a contact lens mold.

It should be appreciated that somewhat different results would be expected where a female mold is used. When a piece of plastic is vacuum formed into a female mold, not shown, the warm plastic extending across the center of the female mold would be drawn to the bottom of the cavity thereof, thereby causing the center portion to bear the greatest stretching to the textured surface.

When the formed plastic 16 is removed from the mold 24 it is itself a mold 14. A print pad 10 can thereafter be formed in the mold 14 using silicone resins and catalysts such as provided by Dow Corning and marketed under its trademark HS III RTV. When the print pad 10 is removed from the mold 14, it will have an outer surface having a texture suitable for printing on polished surfaces of metal, plastic, glass or a crystalline substrate.

What is claimed:

1. A method of manufacturing a print pad for printing on hard surfaces comprising the steps of
    providing a pair of rollers wherein one of said rollers has a textured surface,
    using said rollers to form a sheet of plastic with a textured surface,
    providing a male mold in the form of a print pad,
    heating said formed sheet of plastic and draping said sheet of plastic over said male mold with said textured surface against said male mold to form said sheet of plastic into a female mold,
    providing a silicone resin and a catalyst for forming a silicone plastic and
    mixing said silicone resin and said catalyst and inserting said mixture in said female mold to form a print pad.

* * * * *